United States Patent [19]

Rychen et al.

[11] Patent Number: 5,376,253
[45] Date of Patent: Dec. 27, 1994

[54] APPARATUS FOR THE CONTINUOUS ELECTROCHEMICAL DESALINATION OF AQUEOUS SOLUTIONS

[75] Inventors: Philippe Rychen, Muesbach-le-Haut, France; Samuel Alonso, Aesch, Switzerland; Hans P. Alt, Rheinfelden, Germany; Dominique Gensbittel, Huningue, France

[73] Assignee: Christ AG, Aesch, Switzerland

[21] Appl. No.: 59,761

[22] Filed: May 12, 1993

[30] Foreign Application Priority Data

May 15, 1992 [CH] Switzerland ............... 01 569/92-5
Nov. 26, 1992 [CH] Switzerland ............... 03 627/92-3

[51] Int. Cl.⁵ .................... B01D 61/44; C02F 1/469
[52] U.S. Cl. .................... 204/301; 204/182.4; 204/182.5
[58] Field of Search .................... 204/301, 182.4, 182.5

[56] References Cited

U.S. PATENT DOCUMENTS

| | | | |
|---|---|---|---|
| 2,650,709 | 9/1953 | Rosenak et al. | 210/8.5 |
| 2,741,591 | 4/1956 | Dewey II, et al. | 204/180 |
| 3,585,131 | 6/1971 | Esmond | 210/321 |
| 4,225,413 | 9/1980 | Karn | 204/301 |
| 4,227,295 | 10/1980 | Bodnar et al. | 29/527.3 |
| 4,931,160 | 6/1990 | Giuffrida | 204/301 |
| 4,956,071 | 9/1990 | Giuffrida et al. | 204/301 |
| 4,964,970 | 10/1990 | O'Hare | 204/301 |

FOREIGN PATENT DOCUMENTS

| | | |
|---|---|---|
| 0113387 | 5/1991 | European Pat. Off. |
| 2267118 | 11/1975 | France |
| 489654 | 8/1938 | United Kingdom |
| 1192531 | 5/1970 | United Kingdom |

OTHER PUBLICATIONS

Desalination 16, 225–233 (1975), Elsevier Scientific Publishing Co., Amsterdam.

Primary Examiner—John Niebling
Assistant Examiner—Arun S. Phasge
Attorney, Agent, or Firm—Wenderoth, Lind & Ponack

[57] ABSTRACT

An apparatus for the continuous electrochemical desalination of aqueous solutions includes a wound module having a central electrode, around which are wound an anion exchanger membrane and a cation exchanger membrane, and an outer counterelectrode. Each membrane is sealed at an inner edge thereof and at a outer edge by a respective clamping device, or are anchored in a synthetic resin block, in such a way that a dilution chamber and a concentrate chamber are defined. The dilution chamber and/or the concentrate chamber may contain an ion exchanger resin. The central electrode and the outer counterelectrode each may have a constriction over at least a part of the circumference thereof. The central electrode may furthermore have a recess for receiving the inner clamping device or the inner synthetic resin block in order to achieve a winding having as spiral a cross section as possible.

19 Claims, 5 Drawing Sheets

APPARATUS FOR THE CONTINUOUS ELECTROCHEMICAL DESALINATION OF AQUEOUS SOLUTIONS

BACKGROUND OF THE INVENTION

The invention relates to a new apparatus for the continuous electrochemical desalination of aqueous solutions and is in the form of a wound module.

It has already been known for some time that aqueous solutions can be desalinated by means of electro-dialysis. Appropriate processes and apparatuses are disclosed, for example, in U.S. Pat. No. 2,741,591, U.S. Pat. No. 4,931,160, U.S. Pat. No. 4,956,071,U.S. Pat. No. 4,964,970, EP-B-0 113 387 and desalination 16, 225–233 (1975), Elsevier Scientific Publishing Co., Amsterdam.

According to the known methods, water-impermeable anion and cation exchanger membranes are, as a rule, alternatingly arranged between electrode, which are connected to a direct-current source. The space between two adjacent membranes defines in each case a dilution chamber or a concentration chamber, respectively. If the solution to be desalinated is passed through a dilution chamber, anions are able to migrate under the influence of the electrical potential through the anion exchanger membrane into the adjacent concentrate chamber in the direction of the anode and cations are able to migrate through the cation exchanger membrane into the adjacent concentrate chamber in the direction of the cathode. On the other hand, anions are unable to migrate out of the concentrate chamber through the cation exchanger membrane in the direction of the anode and cations are unable to migrate out of the concentrate chamber through the anion exchanger membrane in the direction of the cathode. As a result of the influence of the electrical potential, a continuous dilution of the dissolved salts in the dilution chambers and continuous concentration in the concentrate chambers is consequently achieved.

It is also known, and in some cases disclosed in the publications mentioned above, that the use of ion exchanger resins in the dilution and/or concentrate chambers contributes to ion exchange and improves conductivity, and that, on the other hand, the ion exchanger resins are regenerated under the action of the electric current. For the purpose of differentiation, electrodialysis using ion exchanger resins is also occasionally referred to as electrodiaresis.

In the known apparatuses, the ion exchanger membranes are usually arranged parallel to one another and to the electrodes in series so as to form a stack. This arrangement has the disadvantages, however, that separate inlet and outlet systems are necessary for every dilution and concentrate chamber and undesirably high current losses occur. In addition, expensive compression devices are needed to seal the membrane stack, but leakage points can nevertheless frequently occur between the dilution chambers and the concentrate chambers.

To avoid these disadvantages, U.S. Pat. No. 4,225413 proposed an electrodialysis apparatus in the form of a wound module in which the anion exchanger membrane and the cation exchanger membrane are wound around a cylindrical, nonconducting core. Wound membrane arrangements had already been proposed for dialysis units in FR-A-2,267,118, U.S. Pat. No. 2,650,709 and GB-A-489,654.

In the electrodialysis apparatus according to U.S. Pat. No. 4,225,413, a central electrode is arrange in the interior of the nonconducting core and the counter-electrode forms the outer casing. The wound membrane arrangement defines a dilution chamber and a concentrate chamber which have approximately spiral cross section and which each have a separate distribution and removal system. The inner ends of the ion exchanger membranes are passed through an opening in the nonconducting core into the interior of the central electrode and are bonded to one another and to the nonconducting core by means of heat or adhesive. The outer ends of the ion exchanger membranes have likewise to be bonded to one another. For this purpose, the ion exchanger membranes have in each case two edges at both ends.

The previously known arrangement is relatively difficult to produce and, in particular, the bonding of various ion exchanger membranes often presents problems and entails an appreciable risk of possible leaks. This is primarily due to the fact that, on the one hand, many of the known ion exchanger membranes continuously have to be kept in the moist state and can therefore only be poorly bonded and on the other hand, ion exchanger membranes which can be processed in the dry state have, as a rule, a certain, troublesome water permeability. It is also troublesome that the dilution chamber and the concentrate chamber form a "hump" over the opening in the nonconducting core, and the achievement of a constant cross section of the chambers and a uniform change in the spacing of the electrodes are made considerably more difficult or even impossible.

SUMMARY OF THE INVENTION

The object of the present invention is to provide an apparatus for the continuous electrochemical desalination of aqueous solutions, wherein the apparatus is in the form of a wound module which has the advantages of the previously known wound module but avoids its disadvantages as far as possible.

A central electrode and an outer counter-electrodes preferably have approximately the shape of a cylinder and a hollow cylinder, respectively, but, as described below, they may deviate from the cylindrical shape, in particular, in that they may have, at least over a part of their circumference, a constriction and/or a recess for receiving a connecting device in the form of an inner clamping device or an inner synthetic resin block. The electrodes may be composed of standard materials. Preferred anode materials are graphite and titanium steel coated with nobel metal; preferred cathode material is stainless steel. For the desalination process it is generally immaterial whether the central electrode is chosen as anode and the outer counterelectrode as cathode or the central electrode as cathode and the outer counterelectrode as anode. The central electrode may be solid or hollow, but in the latter case it is preferably filled with a suitable material, for example a polymer such as polyvinyl chloride, polyethylene or polypropylene.

According to the invention, suitable anion exchanger membranes and cation exchanger membranes in principle can be all the ion exchanger membranes with selective permeability which normally can be used.

To improve ion exchange and conductivity, dilution chamber and/or concentrate chamber may, if desired, contain an ion exchanger resin. Standard ion exchanger resins are suitable for this purpose, and both individual resins and mixed-bed resins may be used. A spacer may, in principle, be dispensed with in chambers containing an ion exchanger resin. It is, however, advisable in this case to arrange a spacer at the two end faces in order to ensure maintenance of the desired spacing more satisfactorily. On the other hand, in chambers which do not contain any ion exchanger resin a spacer is used, preferably over the entire area of the chamber, to ensure flow and to create turbulence. A polymeric grid or a polymeric mesh is, for example, suitable for this purpose. The spacer may be attached to the distribution system or removal system, for example, by means of adhesive or firmly anchored in the clamping devices or in the synthetic resin blocks.

The dilution chamber and the concentrate chamber are each bounded lengthwise by their own distribution or removal system, respectively. The water-impermeable ion exchanger membranes, at their inner and outer ends, are passed around the distribution system for the solution to be treated or around the removal system for the desalinated water and connected by being clamped in the clamping device or anchored in the synthetic resin block behind the distribution or removal system, respectively, in such a way that the dilution chamber is sealed from the concentrate chamber and from the electrodes. The concentrate chamber, on the other hand, is open to the electrodes, as a result of which the concentrate is able to serve at the same time as an electrode rinsing solution. In this connection, the high salt concentration facilitates the rinsing-out of byproducts and the optimum use of the electrodes. An extremely concentrated electrolyte can therefore preferably be fed to the concentrate chamber via its distribution system. Feeding water or dilute aqueous solutions is, however, also suitable in principle.

The concentrate and the diluate (i.e. dilution) may flow outwards from the center of the spiral or vice versa in normal flow or in counterflow to one another in the concentrate chamber and the dilution chamber, respectively.

The distribution and removal systems of the concentrate and dilution chamber may be constructed, for example, as tubes.

The entire winding including electrodes is preferably surrounded by a reinforced polymeric jacket so that it can be regarded as a closed tube from the outside and is resistant to pressure. The two end faces of the wound module are expediently tightly sealed. This can be done, for example, by encapsulating the two end faces of the wound module in respective epoxy-resin blocks. Hydraulic connections and electrical connections to a direct-current source may, in principle, be arranged in any desired way; preferably, however, they are arranged on the end faces of the wound module.

Preferably, the central electrode may have a recess for receiving the inner clamping device or the inner synthetic resin block over a part of its circumference in the axial direction. This achieves the result that deviations from the desired spiral cross section of the winding which might be caused by the inner clamping device or the inner plastic resin block are avoided and, furthermore, that as little electrode area is lost as possible.

After the first winding, the concentrate chamber and the dilution chamber is situated above the concentrate chamber and the dilution chamber of the inner winding, and if a cylindrical central electrode is used, this also results in a certain deviation from the desired spiral cross section. Depending on the thickness of the concentrate chamber and of the dilution chamber, and on the number of windings, this deviation may be more or less troublesome. In order to avoid this and to achieve a spiral winding of the membranes which is as uniform as possible, the central electrode may preferably have a constriction, deviating from the cylindrical shape, in a direction opposite to the winding direction of the membranes, at least over a part of its circumference, on the side of the clamping device lying in the winding direction. The constriction is preferably chosen in such a way that it compensates completely or partly for the influence of the inner winding, i.e. the constriction corresponds at most to the thickness of the dilution chamber and the concentrate chamber taken together.

The outer counterelectrode may also have a corresponding constriction in order to achieve as uniform as possible a spacing of the spiral winding of the membranes, i.e. it may preferably have a constriction, deviating from a direction cylindrical shape, in the opposite membranes to the winding direction of the membranes at least over a part of its circumference, on the side of the outer clamping device or of the outer synthetic resin block lying in the winding direction. The constriction likewise preferably corresponds at most to the thickness of the dilution chamber and the concentrate chamber take together.

The constriction of the central electrode or of the outer counterelectrode may, for example, take place over 180° of its circumference. If both the central electrode and the outer counterelectrode have constrictions, these constrictions are preferably arranged one above the other so that an electrode spacing which is as constant as possible is ensured.

If the outer counterelectrode has a constriction, the outer clamping device or the outer synthetic resin block may preferably be constructed in such a way that the gap formed by the constriction is thereby sealed. In particular, the clamping device or the synthetic resin block may also be constructed in such a way that the constriction of the outer counterelectrode is thereby completed to form the cylindrical shape.

The inner or outer clamping device may preferably be constructed from two parts as a membrane compression system, between which parts a sealing material is arranged, the tight sealing of the dilution chamber being achieved as a result of the fact that each of the two membranes is passed between the sealing material and a respective one of the two parts of the membrane compression system and the two parts are pressed toward one another by mechanical means, for example by means of screws, rivets etc. Preferably, the two parts of the membrane compression system may furthermore be constructed in such a way that the distribution or removal system of the dilution chamber and, if desired, the distribution or removal system of the concentrate chamber in the case of the outer clamping device can also be firmly clamped therewith. The removal or distribution system provided at the central electrode for the concentrate chamber may, for example, be arranged in one of the parts of the membrane compression system. This is preferably achieved by one of the two parts of the membrane compression system of the inner clamping device having a recess for receiving the removal or distribution system of the concentrate chamber.

According to the invention, the dilution chamber can also be tightly sealed from the concentrate chamber and the electrodes by the inner edges and the outer edges, respectively, of the two ion exchanger membranes being firmly anchored in a synthetic resin block. For this purpose, the edges of the ion exchanger membranes are expediently "encapsulated" in the synthetic resin. This is preferably done by immersing the edges of the ion exchanger membranes in the reaction solution during the production of the synthetic resin. Polymeric materials such as polyurethanes, epoxy resins, polyesters and the like are suitable for anchoring the ion exchanger membranes. A particularly suitable class of synthetic resins is the thermosetting plastics. Preferably, the distribution or removal system of the dilution chamber may also be firmly anchored in the synthetic resin block, i.e. be "encapsulated" in the latter over a part of its circumference, or it may be accommodated in a suitable recess in the synthetic resin block after the latter has been formed. In the case of the inner synthetic resin block, the distribution or removal system of the concentrate chamber may also, if desired, be firmly anchored in the synthetic resin block or arranged in a suitable recess. Spacers which are present if need be in the dilution chamber and/or in the concentrate chamber may preferably also be anchored in the synthetic resin block, i.e. be "encapsulated" along their inner or outer edges in the synthetic resin block.

As a result of the spiral-winding arrangement according to the invention, the number of distribution and removal systems can be reduced to a minimum and an ideal electric field which reduces current/voltage losses can be built up. The spiral-winding arrangement also makes possible a very high membrane area/volume ratio and a high process path length in a single hydraulic cell. A single circuit is sufficient for electrode rinsing and concentrate rinsing. Furthermore, the clamping devices or synthetic resin blocks provided according to the invention make possible an optimum, simple and reliable sealing of the two oppositely situated chambers. The wound module according to the invention makes it possible to desalinate aqueous solutions even with relatively high hydraulic outputs of, for example, up to about 1 cubic meter per hour using a module having a length of approximately 1 m and a diameter of 20–25 cm.

BRIEF DESCRIPTION OF THE DRAWINGS

Preferred embodiments of the apparatus according to the invention are shown in FIGS. 1 to 5.

DETAILED DESCRIPTION OF THE INVENTION

Figure 1:
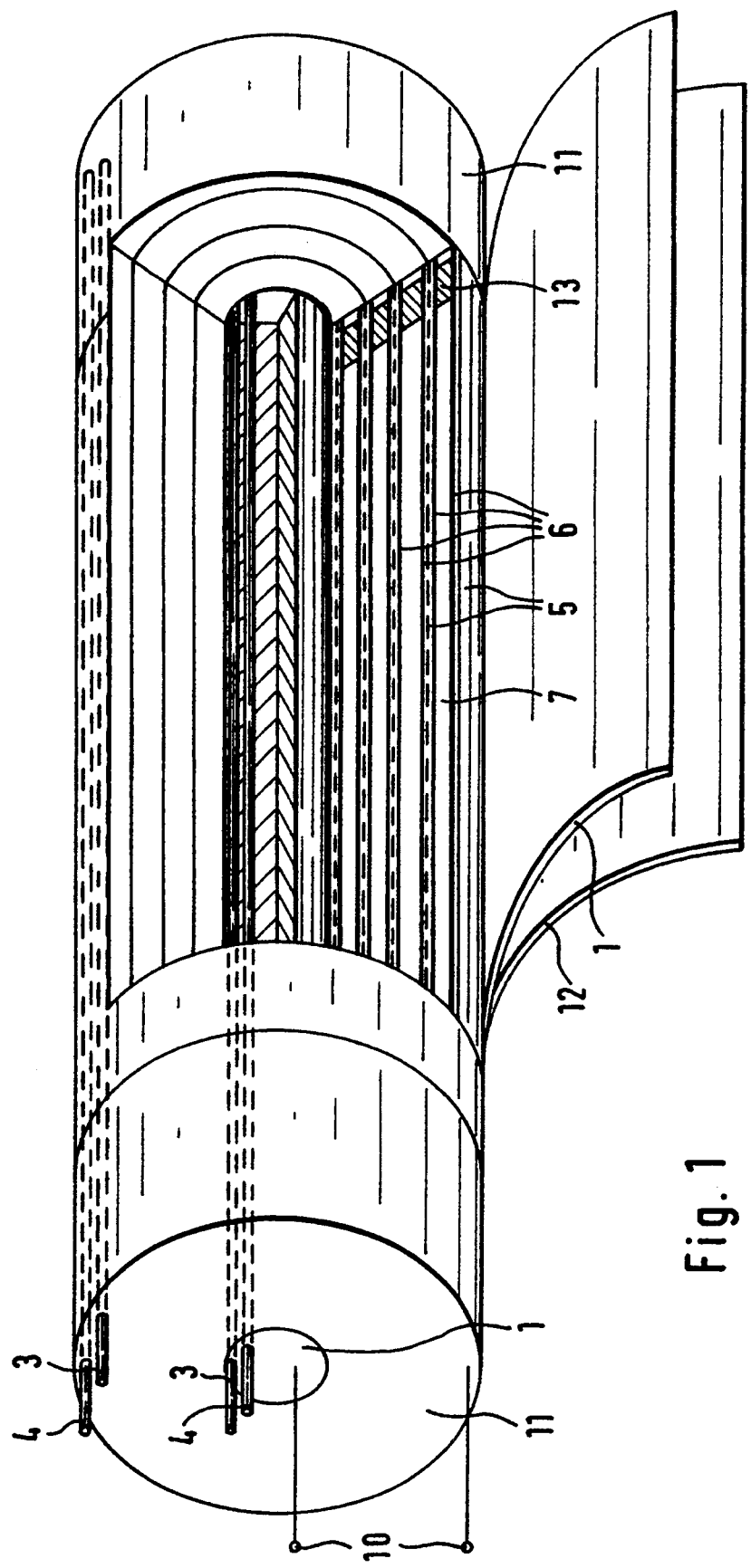
FIG. 1 shows a partly cut-away perspective representation of a wound module according to the invention.

FIG. 1 shows, in a perspective representation, the winding of an anion and a cation exchanger membrane 6 and a central electrode 1, a dilution chamber 7 with a spacer 13 arranged at the end face, a concentrate chamber with spacer 5, a concentrate distribution system or member or removal system or member 4, a distribution system or member for the solution to be treated or a water removal system 3, the outer counterelectrode 1 which is encased by a polymeric jacket 12, end-face epoxy-resin blocks 11 and electrical connections 10 to a direct-current source.

Figure 2:
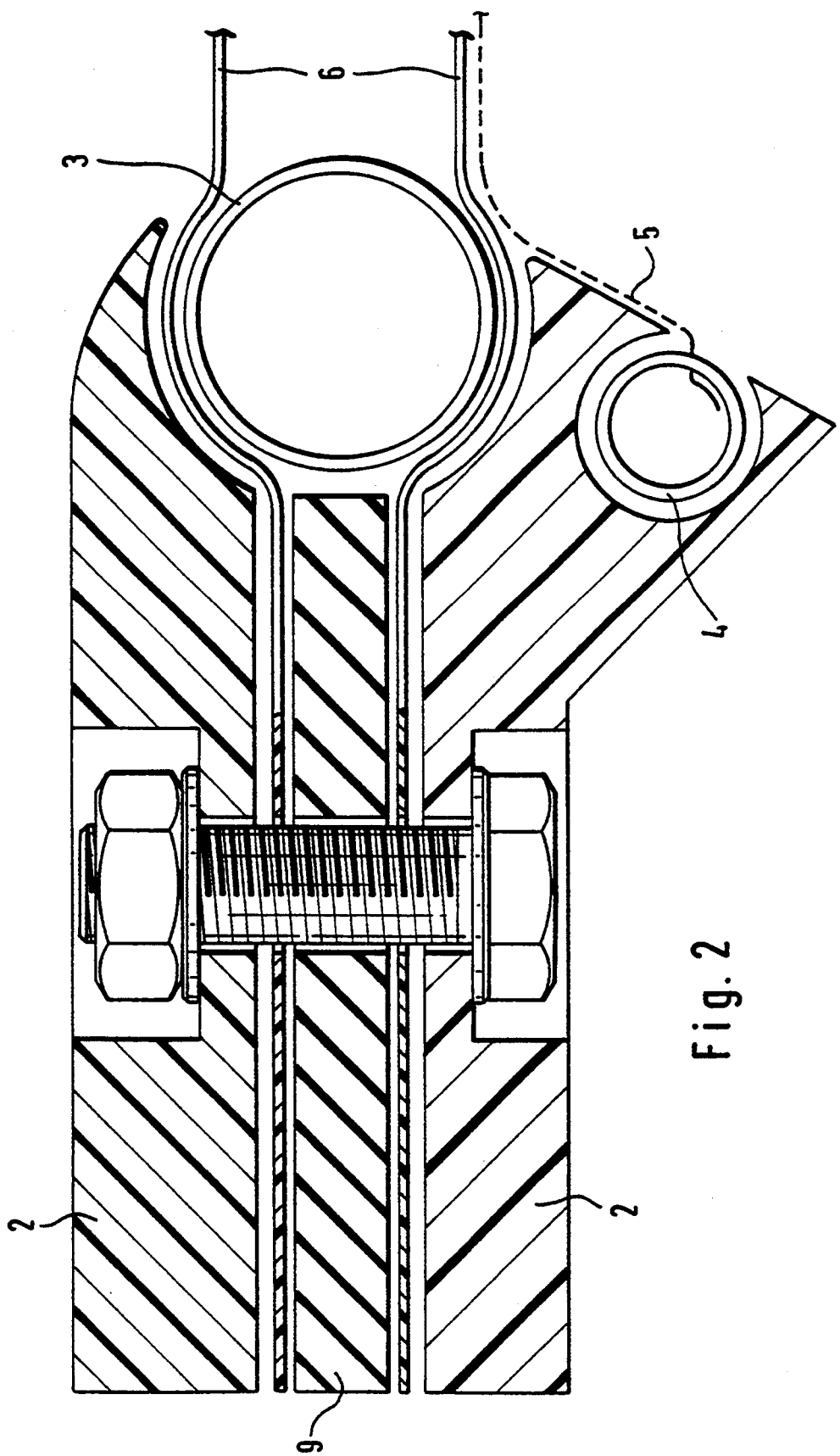
FIG. 2 shows a preferred embodiment of an inner clamping device in detail.

FIG. 2 shows a preferred embodiment of an inner clamping device in a cross section perpendicular to its longitudinal dimension. The clamping device is composed of a membrane compression system 2 made of two parts, between which a sealing material 9 is arranged, each of the cation and anion exchanger membranes 6 is passed between the sealing material and one of the parts of the membrane compression system. By pressing the parts of the membrane compression system 2 together by means of screwing, the dilution chamber is tightly sealed off. FIG. 2, furthermore shows recesses on both parts of the membrane compression system 2 which are matched to the distribution or removal system 3 of the dilution chamber in such a way that system 3 can also be firmly clamped by the clamping device. Furthermore, one of the two parts of the membrane compression system 2 has a recess for receiving the concentrate distribution system or removal system 4. The position of the concentrate chamber spacer 5 is furthermore indicated by a broken line.

Figure 3:
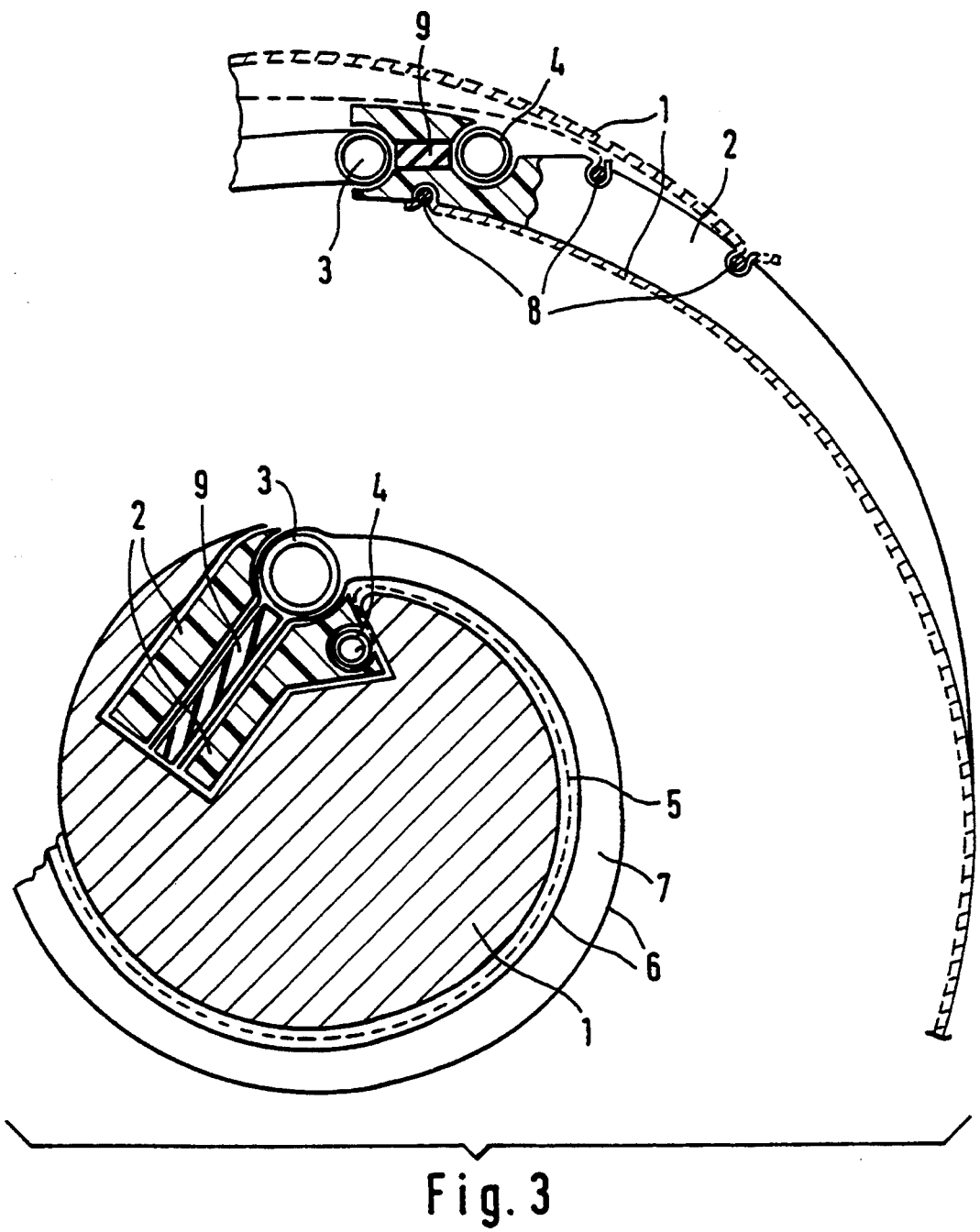
FIGS. 3 and 4 are a partial cross section and a complete cross section, respectively, of the wound module perpendicular to its longitudinal axis.
Figure 4:
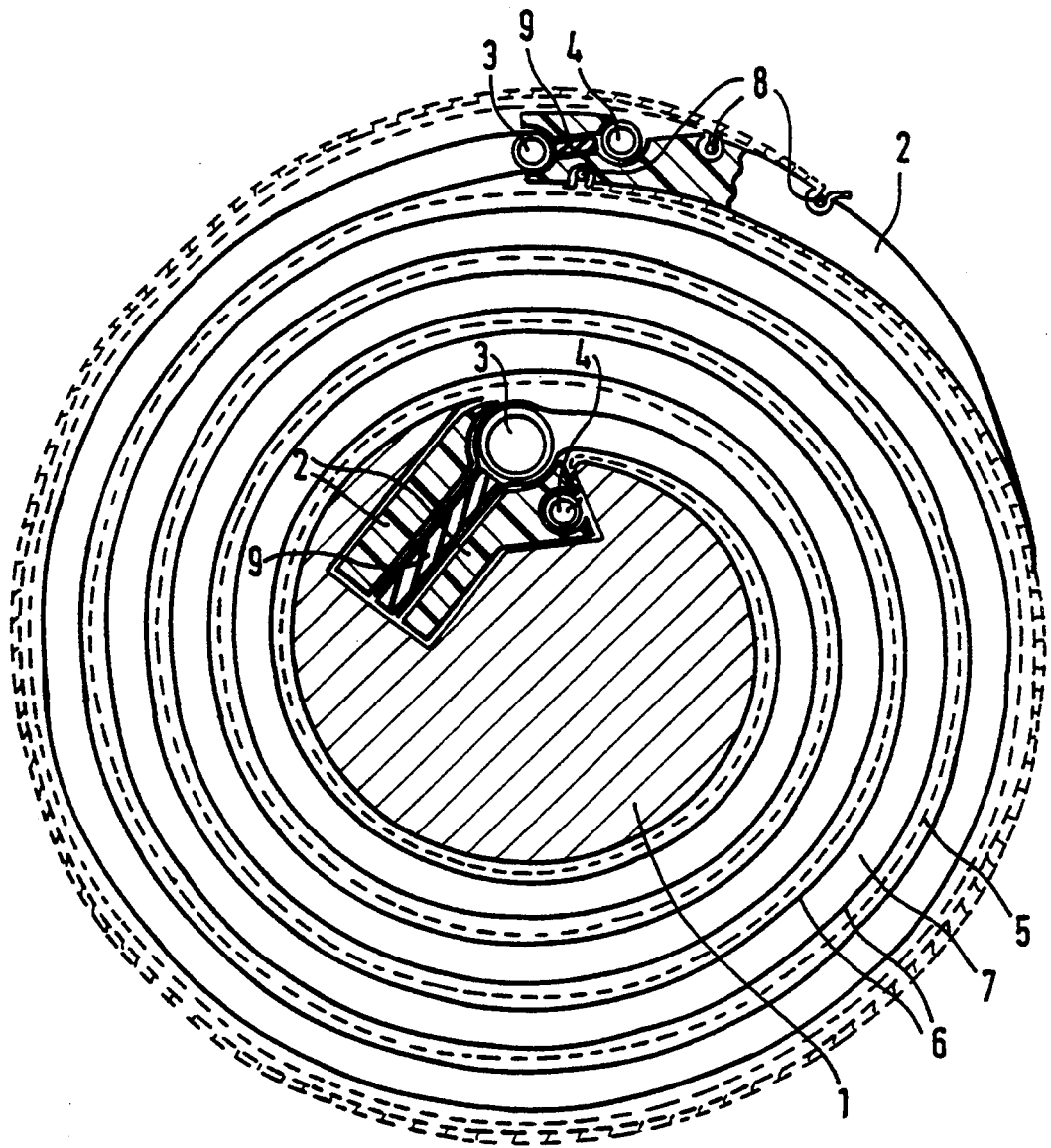

FIGS. 3 and 4, show a cross sections perpendicular to the longitudinal axis of the wound module, the entire cross section being shown in FIG. 4 and only a portion of the cross section being depicted in FIG. 3 with the membrane windings omitted in order to show the clamping devices and the constriction of the electrodes with better clarity. Such figures show the central electrode or outer counterelectrode 1, the two-part membrane compression system 2, the distribution or removal system 3 of the dilution chamber 7, the distribution or removal system 4 of the concentrate chamber, the concentrate chamber spacer 5, the ion exchanger membranes 6, mountings 8 for the outer clamping device and the sealing material 9 between the two parts of the membrane compression system.

Figure 5:
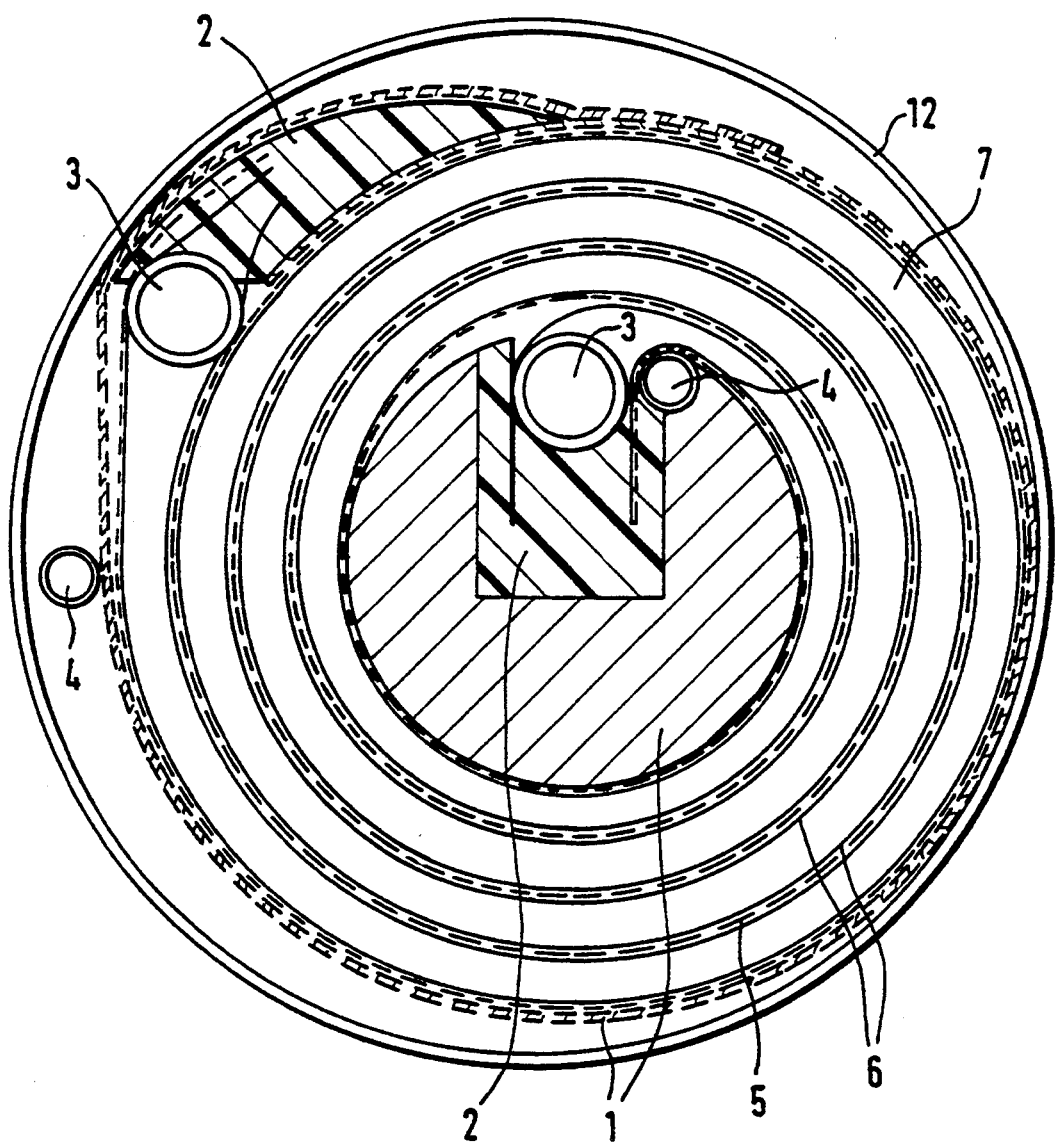
FIG. 5 shows, in cross section, a wound module in which inner and outer edges of ion exchanger membranes are each anchored in a synthetic resin block.

FIG. 5 shows, in a cross section perpendicular to the longitudinal axis of the wound module, a central electrode 1, which is filled with a polymer and has a recess for receiving an inner synthetic resin block 2, an anion and a cation exchanger membrane 6, whose spiral windings enclose a dilution chamber 7 and a concentrate chamber containing spacer 5, inner and outer synthetic resin blocks 2 in which the inner and the outer edges, respectively, of the ion exchanger membranes 6 and of the spacer 5 as well as the distribution system for the solution to be treated or the water removal system 3 are anchored, an outer counterelectrode 1 which is matched to the spiral winding and has passage openings, a concentrate distribution or removal system 4, and a pressure-resistant polymeric jacket and/or a pressure-resistant steel tube 12.

In FIGS. 1–5, the concentrate chamber is shown with a spacer 5 for reasons of better clarity. Of course, the spacer can, if need be, be absent or, preferably, both the concentrate chamber and the diluate chamber may have a spacer.

In FIGS. 1–5, parts having interchangeable functions, namely the electrodes 1, the distribution or removal systems 3 and 4 and the ion exchanger membranes 6, are in each case provided with identical reference symbols. As already mentioned above, the central electrode can be chosen as anode and the outer counterelectrode as cathode or the central electrode as cathode and the outer counterelectrode as anode. The arrangement of the ion exchanger membranes results from the choice of the electrode, the diluate chamber being bounded logically in each case by the anion exchanger membrane in the direction of the anode and by the cation exchanger membrane in the direction of the cathode. The diluate flow and the concentrate flow can be fed from the inside outwards or from the outside inwards independently of one another, i.e. in normal flow or in counterflow. Correspondingly, the distribution system can be arranged in each case on the inside and the removal system on the outside, or vice versa.

We claim:

1. An apparatus for the continuous electrochemical desalinization of aqueous solutions by use of direct current, said apparatus comprising:
   a central electrode;
   an anion exchanger membrane having opposite inner and outer ends;
   a cation exchanger membrane having opposite inner and outer ends;
   said anion and cation exchanger membranes being wound spirally about said central electrode, with said membranes defining therebetween separate dilution and concentrate chambers extending spirally from said central electrode, each said chamber having opposite inner and outer ends;
   an outer counterelectrode concentrically encasing said wound membranes and said chambers;
   said central electrode having an inner connecting device sealingly connected to said inner ends of said membranes such that said inner end of said dilution chamber is tightly sealed from said concentrate chamber and from said central electrode and such that said inner end of said concentrate chamber is open to and not sealed from said central electrode;
   said counterelectrode having an outer connecting device sealingly connected to said outer ends of said membranes such that said outer end of said dilution chamber is tightly sealed from said concentrate chamber and from said counterelectrode and such that said outer end of said concentrate chamber is open to and not sealed from said counterelectrode;
   said dilution chamber having at one said end thereof a distribution member for input of a solution to be treated and at the opposite end thereof a removal member for output of desalinated water;
   said concentrate chamber having at one said end thereof a distribution member for concentrate input and at the opposite end thereof a removal member for concentrate output;
   each said chamber having therein at least one of a spacer and an ion exchange resin; and
   said chambers being sealed at opposite lateral edges thereof.

2. An apparatus as claimed in claim 1, wherein one of said membranes is wound directly on and in contact with said central electrode.

3. An apparatus as claimed in claim 1, wherein said central electrode has formed in an outer circumference thereof an axially extending recess, and said inner connecting device is positioned within said recess.

4. An apparatus as claimed in claim 3, wherein said central electrode has formed in said circumference thereof a constriction from a cylindrical shape, said constriction narrowing circumferentially from said recess.

5. An apparatus as claimed in claim 4, wherein said constriction has a maximum depth equal to a combined thickness of said dilution and concentrate chambers.

6. An apparatus as claimed in claim 1, wherein said counterelectrode has at an inner circumference thereof a constriction from a cylindrical shape, said constriction narrowing circumferentially from said outer connecting device.

7. An apparatus as claimed in claim 6, wherein said constriction has a maximum depth equal to a combined thickness of said dilution and concentrate chambers.

8. An apparatus as claimed in claim 1, wherein each said connecting device comprises a clamping device clamping respective ends of said membranes.

9. An apparatus as claimed in claim 8, wherein said clamping device comprises two compression parts and a sealing member positioned between said two compression parts, the respective said end of each said membrane being clamped between said sealing member and a respective said compression part.

10. An apparatus as claimed in claim 9, further comprising means for pressing said two compression parts toward each other.

11. An apparatus as claimed in claim 9, wherein said two compression parts are shaped to receive therebetween a respective said distribution member or said removal member of said dilution chamber.

12. An apparatus as claimed in claim 11, wherein said respective member is clamped between said two compression parts.

13. An apparatus as claimed in claim 11, wherein said two compression parts also receive therebetween a respective said distribution member or said removal member of said concentrate chamber.

14. An apparatus as claimed in claim 13, wherein said respective member of said concentrate chamber is clamped between said two compression parts.

15. An apparatus as claimed in claim 11, wherein one of said two compression parts has therein a recess receiving a respective said distribution member or said removal member of said concentrate chamber.

16. An apparatus as claimed in claim 1, wherein each said connecting device comprises a synthetic resin block anchoring respective ends of said membranes.

17. An apparatus as claimed in claim 16, wherein said synthetic resin block is formed of thermosetting plastic.

18. An apparatus as claimed in claim 16, wherein a respective said distribution member or said removal member of said dilution chamber is firmly anchored in said synthetic resin block or is arranged in a recess of said synthetic resin block.

19. An apparatus as claimed in claim 1, further comprising a reinforced jacket surrounding and encasing said counterelectrode.

* * * * *